United States Patent
Kimura et al.

(10) Patent No.: US 10,069,699 B2
(45) Date of Patent: Sep. 4, 2018

(54) MONITORING DEVICE INFORMATION ANALYZING DEVICE AND METHOD, AND NON-TRANSITORY STORAGE MEDIUM STORING PROGRAM

(71) Applicant: NIPPON TELEGRAPH AND TELEPHONE CORPORATION, Chiyoda-ku (JP)

(72) Inventors: Tatsuaki Kimura, Musashino (JP); Akio Watanabe, Musashino (JP); Tsuyoshi Toyono, Musashino (JP); Ken Nishimatsu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 247 days.

(21) Appl. No.: 15/042,576

(22) Filed: Feb. 12, 2016

(65) Prior Publication Data
US 2016/0254981 A1 Sep. 1, 2016

Related U.S. Application Data

(60) Provisional application No. 62/121,021, filed on Feb. 26, 2015.

(51) Int. Cl.
*G06F 15/16* (2006.01)
*H04L 12/26* (2006.01)
(Continued)

(52) U.S. Cl.
CPC ........... *H04L 43/08* (2013.01); *H04L 41/069* (2013.01); *H04L 41/0686* (2013.01);
(Continued)

(58) Field of Classification Search
CPC ............... H04L 41/0686; H04L 41/069; H04L 41/0266; H04L 43/08; H04L 43/16;
(Continued)

(56) References Cited

U.S. PATENT DOCUMENTS 8,850,263 B1 * 9/2014 Yourtee ............... G06F 11/0709
714/20
2006/0149748 A1 * 7/2006 Yamakawa ....... G06F 17/30079
(Continued)

FOREIGN PATENT DOCUMENTS

| JP | 2009-211472 A | 9/2009 |
|---|---|---|
| JP | 2010-152773 A | 7/2010 |
| WO | WO 2010/032701 A1 | 3/2010 |

OTHER PUBLICATIONS

"Splunk for the People", Splunk http://www.splunk.com/, 2014, 7 pgs.
(Continued)

*Primary Examiner* — Jungwon Chang
(74) *Attorney, Agent, or Firm* — Oblon, McClelland, Maier & Neustadt, L.L.P.

(57) ABSTRACT

A monitoring device information analyzing device calculates a log variation amount from a log variation amount of a monitoring target device h and a log variation amount of the monitoring target device on another day, by referring to a template information storage unit storing a time at which a log message arises, the log message arising in the past, a template that is associated with an ID of the monitoring target device, and a template ID of the template to calculate the log variation amount of the monitoring target device and to obtain the log variation amount of the monitoring target device on the other day at the same time zone; obtains the log variation amount that is to be a sample; executes verification according to a statistical method, and determines
(Continued)

the sample as an advance log, if a test statistic is greater than a predetermined threshold value.

8 Claims, 5 Drawing Sheets

(51) Int. Cl.
  *H04L 29/06* (2006.01)
  *H04L 12/24* (2006.01)
(52) U.S. Cl.
  CPC .......... *H04L 41/0631* (2013.01); *H04L 43/04* (2013.01); *H04L 43/16* (2013.01); *H04L 63/1416* (2013.01)
(58) Field of Classification Search
  CPC . H04L 43/04; H04L 41/0631; H04L 63/1416; G06F 11/079; G06F 11/0709; G06F 11/0781; G06F 17/30079; G06F 17/30289
  USPC ............... 709/223–224; 714/37, 20; 707/803
  See application file for complete search history.

(56) References Cited

U.S. PATENT DOCUMENTS

| 2011/0047414 A1* | 2/2011 | Kudo | G06F 11/079 714/37 |
| 2011/0161743 A1 | 6/2011 | Kato | |
| 2012/0117226 A1* | 5/2012 | Tanaka | H04L 41/0266 709/224 |
| 2013/0042147 A1* | 2/2013 | Tonouchi | G06F 11/0781 714/37 |
| 2014/0149466 A1* | 5/2014 | Sato | G06F 17/30289 707/803 |
| 2014/0173363 A1 | 6/2014 | Kato | |
| 2015/0149826 A1* | 5/2015 | Anderson | G06F 11/3476 714/37 |
| 2016/0124792 A1* | 5/2016 | Togawa | G06F 11/079 714/37 |

OTHER PUBLICATIONS

Tongqing Qiu, et al., "What Happened in my Network? Mining Network Events from Router Syslogs", In IMC, 2010, 13 pgs.
Ajay Mahimkar, et al., "Rapid Detection of Maintenance Induced Changes in Service Performance", In ACM CoNEXT (International Conference on emerging Networking Experiments and Technologies), 2011, 12 pgs.
Tatsuaki Kimura, et al., "Online template extraction from large scale network logs", IEICE Society Conference, 2013, 5 pgs. (with English translation).
Irad Ben-Gal, "Outlier Detection", http://www.eng.tau.ac.il/~bengal/outlier.pdf, 2005, 16 pgs.
Office Action dated Feb. 23, 2016 in Japanese Patent Application 2014-025534.

* cited by examiner

MONITORING DEVICE INFORMATION ANALYZING DEVICE AND METHOD, AND NON-TRANSITORY STORAGE MEDIUM STORING PROGRAM

BACKGROUND OF THE INVENTION

1. Field of the Invention

The present invention relates to a monitoring device information analyzing device and method, and a non-transitory storage medium storing a program, and especially relates to a monitoring device information analyzing device and method, and a non-transitory storage medium storing a program for extracting information that is useful for a user from log information that is output by various types of devices.

2. Description of the Related Art

Recently, centralized monitoring and management of devices and software programs, which are of different manufacturers and which have different roles, are performed for cost reduction, as a main reason. Meanwhile, each of such various types of devices and software has a mechanism, which has its own form, for outputting a log, and it is used for monitoring and management of a device. With the development of information devices, these log information items have been complicated and increased in sizes, so that it is not possible to monitor all of them on a daily basis, and analysis itself is a problem.

In this situation, as in Non-Patent Document 1, there is an analyzing infrastructure for simplifying a log analysis by collecting data items of devices and indexing them.

Non-Patent Document 2 proposes a method of displaying digest information of syslog, a target of which is syslog that is generated by a network device, such as a router, by using a positional relationship or the like of the router, and an abnormality detection method using a frequency, etc.

Non-Patent Document 3 proposes a method of detecting an abnormality that is caused by construction work, such as a setting change or the like of a device in a network. That is, a method such that a point of time of the construction work is provided in advance, and changes in indexes, such as an amount of generation of logs and traffic volume, at the point of time are detected.

[Non-Patent Document 1] Splunk http://www.splunk.com/
[Non-Patent Document 2] T. Qiu, Z. Ge, D. Pei, J. Wang, J, Xu, "What Happened in my Network?Mining Network Events from Router Syslogs", In IMC, 2010.
[Non-Patent Document 3] Ajay Mahimkar, Zihui Ge, Jia Wang, Jennifer Yates, Yin Zhang, Joanne Emmons, Brian Huntley, Mark Stockert, "Rapid Detection of Maintenance Induced Changes in Service Performance," In ACM CoNEXT (International Conference on emerging Networking EXperiments and Technologies), 2011.
[Non-Patent Document 4] Kimura Tatsuaki, Watanabe Akio, Toyono Tsuyoshi, Nishimatsu Ken, Shiomoto Kouhei, Online template extraction from large scale network logs, IEICE Society Conference, 2013.

SUMMARY OF THE INVENTION

However, in order to find hidden and meaningful log information from massive and complicated logs, a technique of above-described Non-Patent Document 1 requires prior knowledge regarding meaning of generation of individual logs and contents of log messages, and experience regarding systems.

Further, a technique of Non-Patent Document 2 only displays digest information, and it is not possible to determined whether the actually obtained information is important for operation.

A technique of Non-Patent Document 3 may not be utilized for finding a sign log that occurs prior to a failure, a change in an amount of generation, and so forth.

Further, various abnormality detecting techniques have been proposed other than these techniques; however, there is no technique for extracting emergence of a meaningful log with respect to a specific event, such as a sign log for a failure.

Embodiments of the present invention have been developed in view of the above-described point. There is a need for a monitoring device information analyzing device that is capable of extracting an advance sign log (a log such that there is a significant change in an amount of generation before and after) for a specific event without directly knowing, by a user, the meaning of a log message that is generated by a device.

According to an aspect of the present invention, there is provided a monitoring device information analyzing device that extracts, from log information that is output from a plurality of monitoring target devices, a log such that there is a change in an amount of generation before and after a specific event, the monitoring device information analyzing device including a log variation amount calculation unit that calculates a log variation amount that is to be a sample from a log variation amount of a monitoring target device h and a log variation amount of the monitoring target device h on another day at a same time zone, by referring to, upon a given target event, the monitoring target device h, time of occurrence and end time of the target event, and a time width $(T_{pre}, T_{pos})$ before and after the target event being provided, a template information storage unit storing a time at which a log message arises, the log message arising in a past, a template that is associated with an ID of the monitoring target device h, and a template ID of the template to calculate the log variation amount of the monitoring target device h and to obtain the log variation amount of the monitoring target device h on the other day at the same time zone; and a verification unit that obtains the log variation amount that is to be the sample, that executes verification according to a statistical method by using the sample, and that determines the sample as an advance log, if a test statistic is greater than a predetermined threshold value.

According to another aspect of the present invention, there is provided a monitoring device information analyzing method that extracts, from log information that is output from a plurality of monitoring target devices, a log such that there is a change in an amount of generation before and after a specific event, the monitoring device information analyzing method including a log variation amount calculation step of calculating a log variation amount that is to be a sample from a log variation amount of a monitoring target device h and a log variation amount of the monitoring target device h on another day at a same time zone, by referring to, upon a given target event, the monitoring target device h, time of occurrence and end time of the target event, and a time width $(T_{pre}, T_{pos})$ before and after the target event being provided, a template information storage unit storing a time at which a log message arises, the log message arising in a past, a template that is associated with an ID of the monitoring target device h, and a template ID of the template to calculate the log variation amount of the monitoring target device h and to obtain the log variation amount of the monitoring target device h on the other day at the same time zone; and a verification step of obtaining the log variation amount that is to be the sample, executing verification according to a statistical method by using the sample, and determining the sample as an advance log, if a test statistic is greater than a predetermined threshold value.

According to another aspect of the present invention, there is provided a non-transitory storage medium storing a monitoring device information analyzing program for causing a computer to function as a monitoring device information analyzing device that extracts, from log information that is output from a plurality of monitoring target devices, a log such that there is a change in an amount of generation before and after a specific event, wherein the monitoring device information analyzing device includes a log variation amount calculation unit that calculates a log variation amount that is to be a sample from a log variation amount of a monitoring target device h and a log variation amount of the monitoring target device h on another day at a same time zone, by referring to, upon a given target event, the monitoring target device h, time of occurrence and end time of the target event, and a time width ($T_{pre}$, $T_{pos}$) before and after the target event being provided, a template information storage unit storing a time at which a log message arises, the log message arising in a past, a template that is associated with an ID of the monitoring target device h, and a template ID of the template to calculate the log variation amount of the monitoring target device h and to obtain the log variation amount of the monitoring target device h on the other day at the same time zone; and a verification unit that obtains the log variation amount that is to be the sample, that executes verification according to a statistical method by using the sample, and that determines the sample as an advance log, if a test statistic is greater than a predetermined threshold value.

According to an embodiment of the present invention, it becomes possible to extract a log such that there is a change in an amount of generation before and after a specific event, without directly knowing, by a user, meaning of a log message that is generated by a device.

Other objects, features and advantages of the present invention will become more apparent from the following detailed description when read in conjunction with the accompanying drawings.

DETAILED DESCRIPTION OF THE PREFERRED EMBODIMENTS

An embodiment of the present invention is described together with the figures below.

In the embodiment, there is extracted a log such that there is a change in an amount of generation before and after a specific event by analyzing sufficient past information that is generated by a group of devices, which is to be monitored by a user.

First Embodiment

Figure 1:
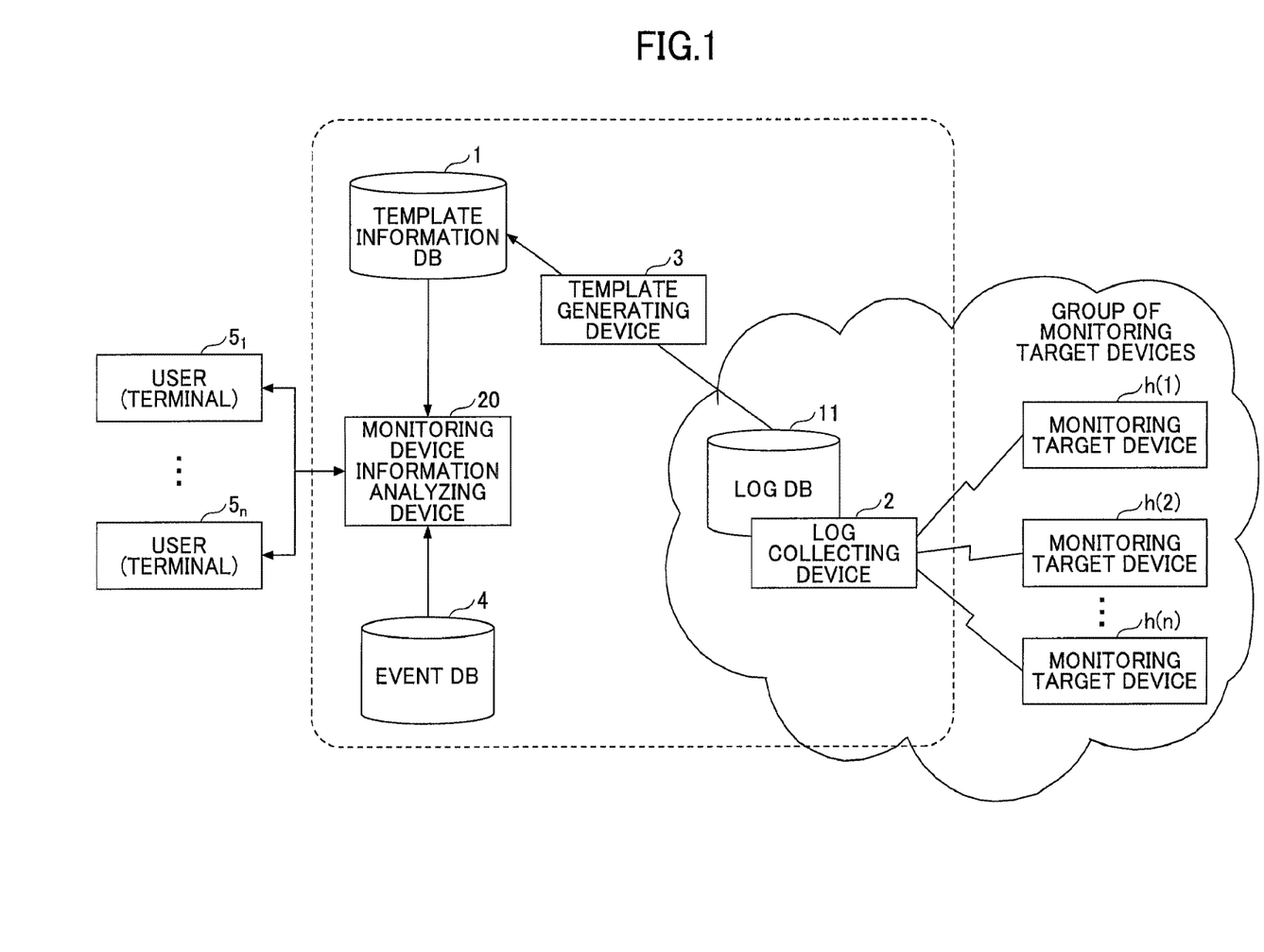
FIG. 1 is a diagram showing a system configuration example according to a first embodiment of the present invention.

FIG. 1 shows a system configuration example in a first embodiment of the present invention.

The system that is shown in the figure shows a configuration during off-line use.

The system shown in the figure includes a group of devices to be monitored including monitoring target devices h(1)-h(n); a log collecting device 2 that collects log information from the group of devices in a centralized manner; a log DB 11 that stores the log information that is collected by the log collecting device 2; a template generating device 3 that generates a template from the log information of the log DB 11; a template information DB 1 that stores the generated template; an event DB 4 that records specific event information, such as a failure; and a monitoring device information analyzing device 20 that extracts a log such that there is a change in an amount of generation, based on information of the template information DB 1 and the event DB 4. For the template information, a part that is considered to be important in the log information (which is described as "template," hereinafter) is extracted from the log information of the monitoring target device h that is stored in the log DB 11 in the past by using, here, a template extraction method of the Non-Patent Document 4 or the like that is stored in the template information DB 1 in advance, and a template ID is attached. The template ID is represented by i=1, 2, . . . , I.

It is assumed that the log information that is generated by the monitoring target device h, which is to be connected to the log collecting device 2, includes information that indicates the monitoring target device h that generates the log information, and that the monitoring target device h can be identified. IDs are assigned to all the monitoring target devices h, which are represented by h=1, 2, . . . , H.

In the system that is shown in FIG. 1, a case is assumed where the log information that is collected by the log collecting device 2 is stored in the log DB 11 in advance, and an advance log is extracted by performing off-line analysis after each of failures.

The template generating device 3 determines which log template matches the log information that is obtained from the log DB 11, together with the time at which it arises, and a monitoring device ID; attaches a log template ID that uniquely corresponds to a log template; and stores it in the template DB 1. It is assumed that which template I is generated from which monitoring target device h at what time point is determined in this manner.

The present invention identifies a log whose behavior of occurrence is deemed to be changed before and after the event by analyzing logs before and after a specific event, such as a failure, and logs that are generated on another day at the same time zone, logs that are generated by another monitoring target device at the same time zone, and so forth. Hereinafter, it is described as "an advance log."

There is no problem that the log information that is to be input to the log collecting device 2 is that of any device; however, a syslog of a router for network monitoring or the like can be considered, for example.

Figure 2:
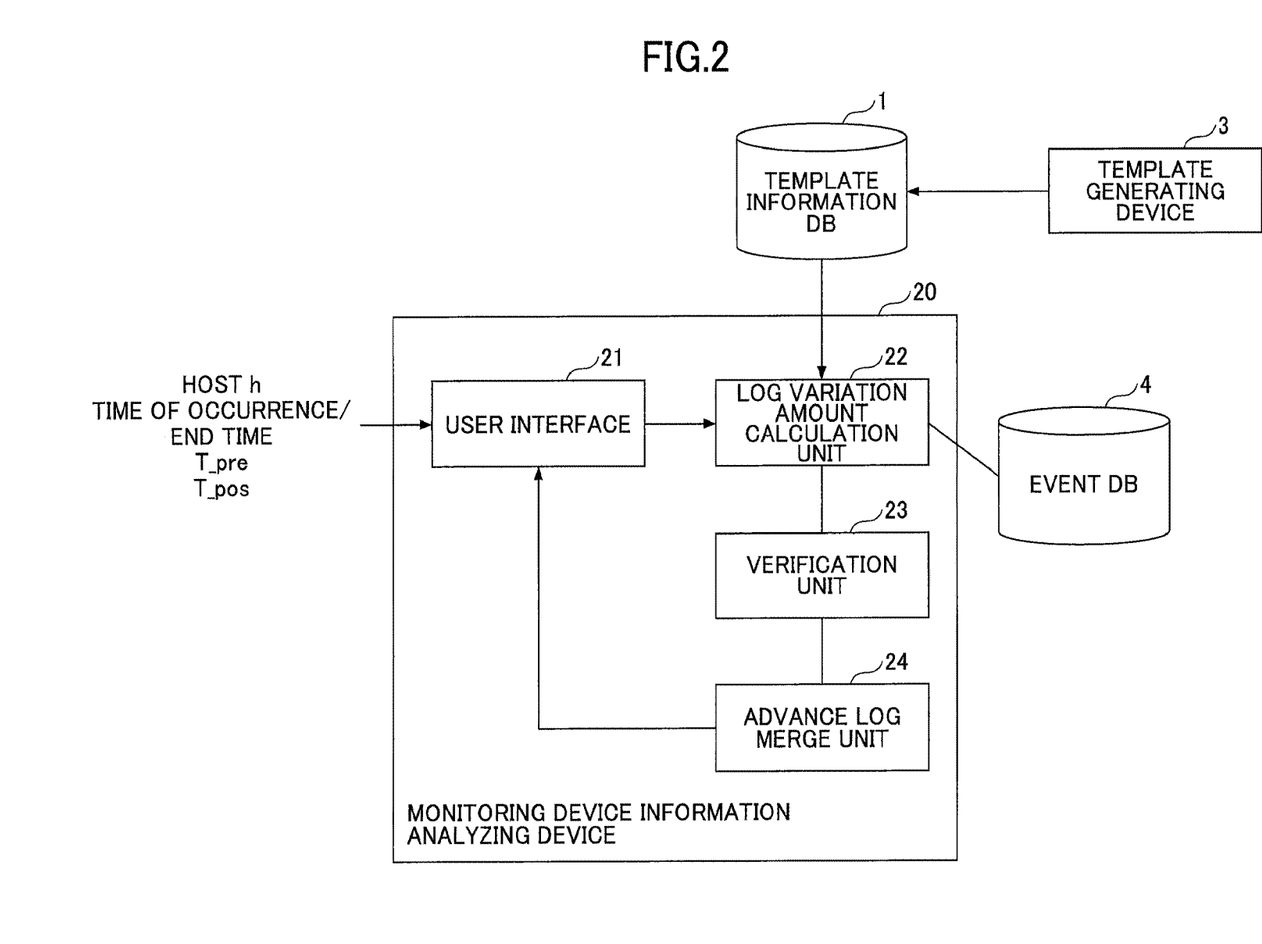
FIG. 2 is a diagram showing a configuration example of a monitoring device information analyzing device in the first embodiment of the present invention.

FIG. 2 shows a configuration example of the monitoring device information analyzing device in an embodiment of the present invention.

The monitoring device information analyzing device 20 is connected to the template information DB 1.

The monitoring device information analyzing device 20 includes a user interface 21; a log variation amount calculation unit 22; a verification unit 23; and an advance log merge unit 24.

In the example of FIG. 1, the template DB 1 and the event DB 4 are disposed outside the monitoring device information analyzing device 20; however, they may be disposed inside the monitoring device information analyzing device 20, without being limited to this example.

The user interface 21 obtains information items, such as an event that is specified by a user 5 and that is desired to be analyzed (a target event), a monitoring target device, a time width (a time period before and after the target event), and so forth, and outputs, to the user 5, the advance log that is extracted by performing processes by the log variation amount calculation unit 22, the verification unit 23, and the advance log merge unit 24, which are described below.

The log variation amount calculation unit 22 obtains, from the template information DB 1, an amount of generation of templates of the monitoring target device (h) in the specified time width and an amount of generation of templates of the monitoring target device (h) in the same time zone on the day that is n days before a failure, based on an event that is obtained by referring to the event DB 4 based on the target event that is specified by the user 5 and the ID of the monitoring target device, and calculates a log variation amount of events that occur in the time width on the day on which the target event occurs by applying predetermined definitions, which are described below.

The verification unit 23 obtains, as a sample, the log variation amount that is obtained by the log variation amount calculation unit 22, and detects the advance log by performing verification according to a statistical method by using the sample. For performing the verification, if the extracted number of samples is insufficient, the log variation amount calculation unit 22 is instructed to calculate an amount of generation of templates of a device other than the monitoring target device h, and to calculate a log variation amount, and they are obtained.

The advance log merge unit 24 outputs, to the user interface 21, a result of merging the advance logs that are detected for all the events.

Figure 3:
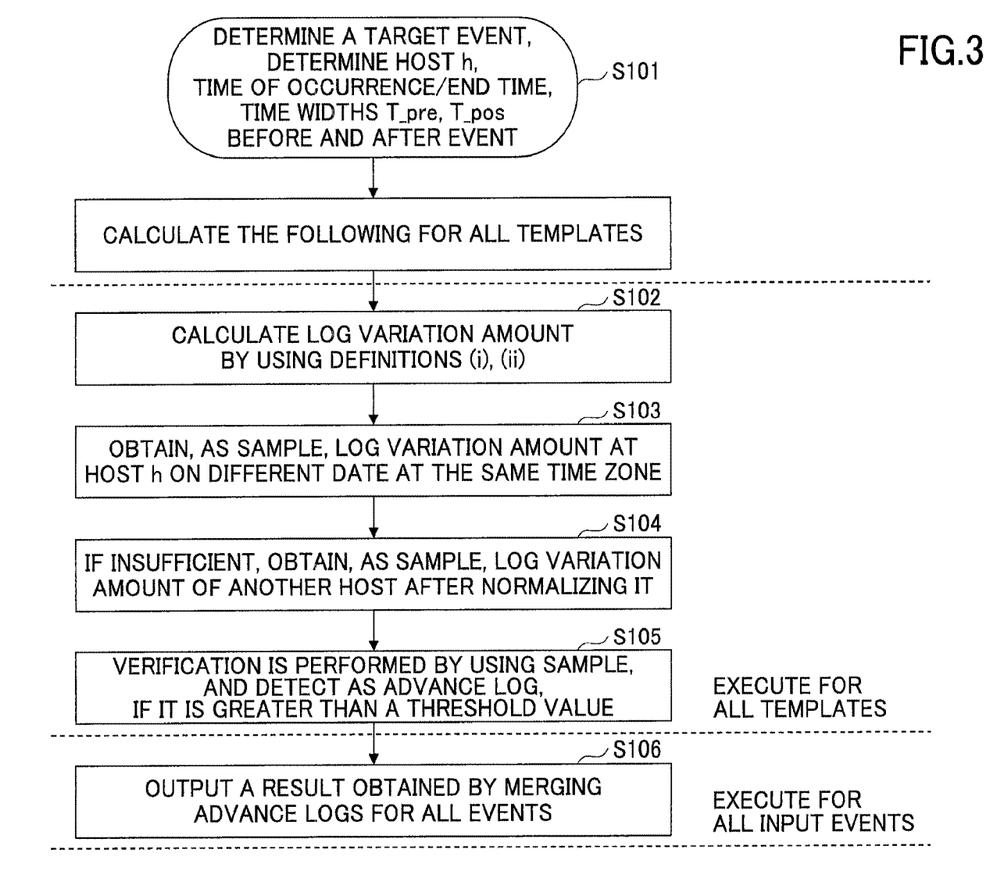
FIG. 3 is a diagram illustrating a flowchart of an analyzing process in the first embodiment of the present invention.

FIG. 3 is a flowchart of an analyzing process in an embodiment of the present invention.

Step 101) The log variation amount calculation unit 22 specifies, in the event DB 4, a target event that is specified by a user, and obtains, through the user interface 21, a specific event (which is described as "a target event," hereinafter), a monitoring target device h, time of occurrence/end time, and a time width before and after the target event $T_{pre}$, $T_{pos}$. Note that, instead of the time of occurrence/end time, an item that has a width, such as time of occurrence of a failure/restoration time, may be used. The time width $T_{pre}$, $T_{pos}$ before and after the target event can be properly set by a user 5, and it means a time interval for observing a change in an amount of generation of logs that are generated prior to the event and logs that are generated after the event. Note that the amounts of generation the templates i in the monitoring target device h that are generated $T_{pre}$ hours prior to the time of occurrence of the target event, and that are generated $T_{pos}$ hours after the end time of the target event are respectively represented by $p_{ih}$ and $q_{ih}$ below.

Step 102) The log variation amount calculation unit 22 obtains, by referring to the template DB 1 and by using the monitoring target device h, the time of occurrence/end time, and the time width before and after the target event $T_{pre}$, $T_{pos}$, which are obtained at step 101, the amount of generation of templates $p_{ih}$, which are generated $T_{pre}$ hours before the time of occurrence, of the monitoring target device h, and the amount of generation of templates i $q_{ih}$, which are generated $T_{pos}$ hours after the end time, of the monitoring target device h, and stores them in a memory (not depicted).

Further, the log variation amount calculation unit 22 obtains, by referring to the template DB 1, amounts of generation of templates i of the monitoring target device h in the same time zone ($T_{pre}$ before the occurrence time of the target event, and $T_{pos}$ after the end time of the target event) on n days before (n=1, 2, . . . , n) a failure in the monitoring target device h as $p_{ih}(n)$, $q_{ih}(n)$, and stores them in the memory (not depicted). Here, the way of setting n days before is optional, and the user can specify, through the user interface 21, only the same day of the week, or specify only the same date of another month, for example.

The log variation amount calculation unit 22 obtains the amounts of generation of templates (pih, qih, pih(n), qih(n)) that are stored in the memory (not depicted), and obtains the log variation amount by using the following definition i, and definition ii.

$$x = |p_{ih} - q_{ih}| \qquad \text{Definition i)}$$

or $$x_n = |p_{ih}(n) - q_{ih}(n)|$$

or $$x_n = |p_{ih}(n)/q_{ih}(n)| \qquad \text{Definition ii)}$$

For the above-described definition ii, because of the limitation of the range due to existence of a case where 0 is included as $q(_{ih})$, modifications, such as $$x_n = \log(p_{ih}(n)/(1+q_{ih}(n)))$$

and $$x_n = |p_{ih}(n)+1/q_{ih}(n)+1|$$

can be considered; however, that are equivalent in a point that the ratio between $p_{ih}$ and $q_{ih}$ is utilized. In the following, for simplicity, only the case where (definition i) is used is described; however, for the procedure, the same applies to the case of the definition ii.

The above-described definition i and definition ii of the log variation amount have the following differences.

For the definition i, since it represents a relative difference of logs, for example, a difference between logs that are always generated in a large amount (x=1 for a case of $p_{ih}$=100, and $q_{ih}$=99) and a log that is generated only once (x=1 for a case of $p_{ih}$=1, and $q_{ih}$=0) are treated as the same, and they are considered to be "abnormal." Whereas, for a case of the definition ii, since their ratio is calculated, the degree of abnormality for the case where the large amount is generated (x=101/100 for a case of $p_{ih}$=100, and $q_{ih}$=99) is considered to be less than that of the log that is generated only once (x=2/1 for the case of $p_{ih}$=1, and $q_{ih}$=0). A user can specify either definition depending on a purpose.

Then, x or $x_n$ that is obtained above is stored in the memory (not depicted) as a sample.

Step 103) The verification unit 23 obtains, as the sample, the log variation amount that is obtained at step 102 (that is x if the definition i is used, and $x_n$ if the definition ii is used) from the memory (not depicted).

Step 104) The user sets a threshold value through the user interface 21, and if the sample is less than the threshold value, the log variation amount calculation unit 22 is instructed to calculate the log variation amount of a monitoring target device h' other then the monitoring target device h, and a sample $x_{h'}$ that is calculated from the log variation amount of the monitoring target device h' by a method that is the same as that of above-described step 102 is obtained.

Depending on a situation, there is a case where logs of the monitoring target device h on n days before are not sufficiently obtained, or a case where detection is difficult because many abnormal values are included. In such a case, the number of samples can be increased by using information on samples of another monitoring target device in the following manner. The samples is obtained as a variation amount before and after the target event $x_{h'}=|p_{ih'}-q_{ih'}|$ of a device h' (h'≠h) other than the monitoring target device h. In this manner, since it is desirable that the monitoring target device h' that is used as the sample is a device having a device role and a type that are the same as those of the target event, if it is provided in advance, it is assumed that the user 5 specifies a group of monitoring target devices that is used as a sample.

In the monitoring target device h' that is used as the sample, a manner of outputting the template i may not be the same, so that it is necessary to correct this in advance. To do this, a method of correcting by using the function f( ), namely, a method where $x_{h'}:=f(x_h)$ can be considered; however, a case is considered where f( ) is simply a linear polynomial, as an example.

Past $x_{h'}$ and $x_h$ are prepared as samples for n days, and these are fitted as a linear polynomial. There are various methods, and there are sum of squares error minimization and margin maximization, for example.

Step 105) The verification unit 23 executes verification according to any statistical method by using the samples that are obtained at above-described step 103 and the samples that are obtained at step 104 depending on necessity, and if it is greater than a predetermined threshold value, it is detected as an advance log.

The method of executing the verification is optional; however, there are, for example, a normal distribution-based test, a Hampel test, a QUARTILE method, a t-test, and so forth.

<Normal Distribution-Based Test Method>

Here, a normal distribution-based test method is described.

Suppose $$\mu=\Sigma x_n/N, \sigma=\Sigma(x_n-\mu)^2/N \quad \text{[Expression 1]}$$

(where, $\mu$ is an average, and $\sigma$ is a standard deviation), and if a test statistic $|x-\mu|/\sigma$ is greater than or equal to a threshold value, it is detected as an advance log. It is determined to be effective, if there are a number of samples N that is greater than or equal to a predetermined value, and $x_n$ follows a normal distribution.

<Detection Method by Hampel Test>

The Hampel test is described in Non-Patent Document 5 (OUTLIER DETECTION: http://www.eng.tau.ac.il/~bengal/outlier.pdf).

In the above-described normal distribution-based test method, if an abnormal value is included in the samples, the value of the average $\mu$ and the value of the standard deviation $\sigma$ may be separated from the normal values by receiving its effect. Whereas, the Hample test is a method of mitigating these effects, where median of $x_n$=median($x_n$) is calculated as $$(MAD_\sigma)^2 = \text{median}|x - \text{median}(xn)|, \quad \text{[Expression 2]}$$

and if a test quantity $$|x - \text{median}(xn)|/MAD_\sigma \quad \text{[Expression 3]}$$

exceeds a threshold value, it is detected as an advance log. The method takes into account that a singular point exists in the samples by using the median, instead of an average.

The advance log that is obtained by the above-described process is stored in the memory (not depicted).

Step 106) After executing the above-described process of steps 102-105 for all the templates, advance logs that are detected up to step 105 are merged for all the input events, and it is output through the user interface 21.

Second Embodiment

In the previously described first embodiment, the event information is stored in the event DB 4 in advance, and the case is considered where determining the advance logs is applied off-line, however, in this embodiment, a case is described where the event is at the present time, and it is used while extracting advance logs online.

Figure 4:
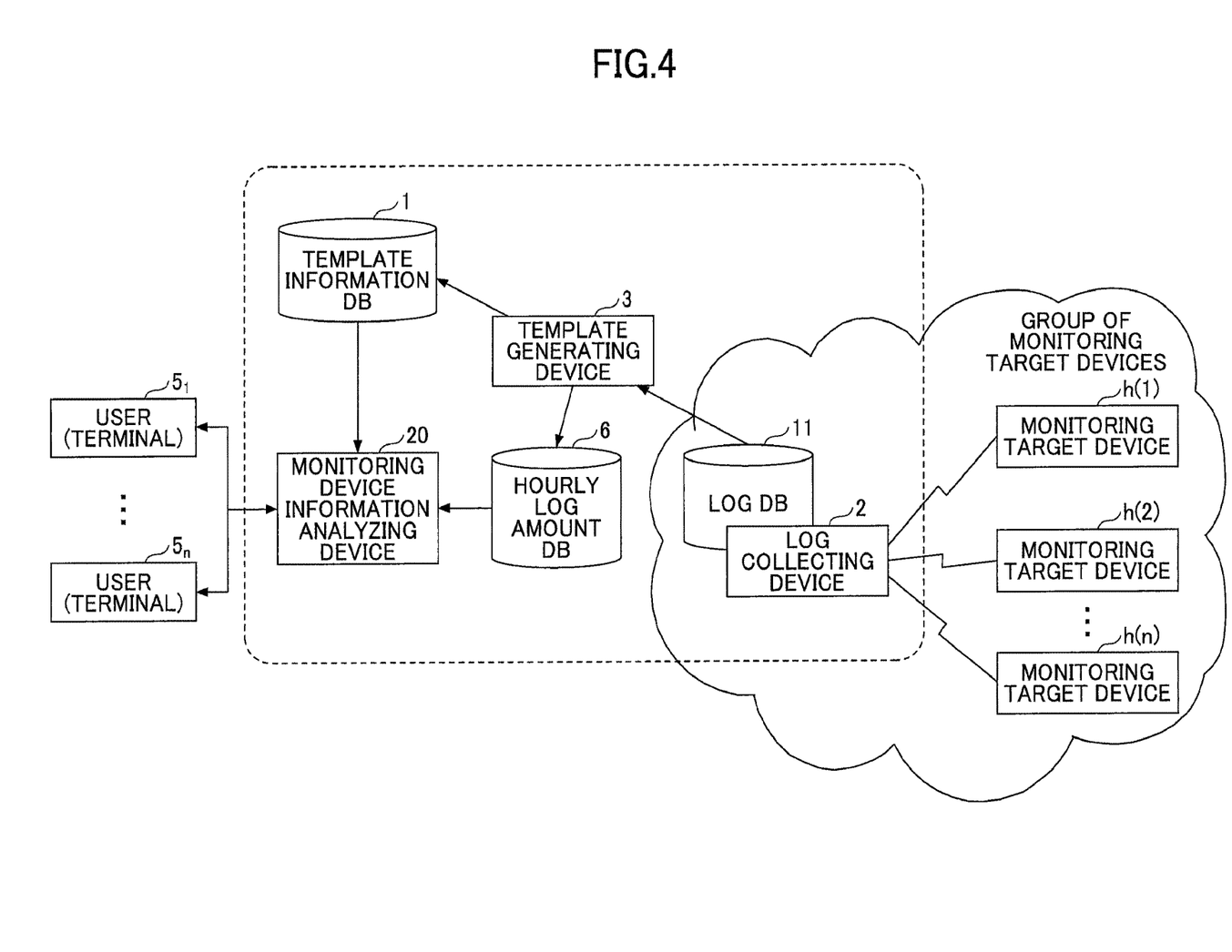
FIG. 4 is a diagram showing a system configuration example in a second embodiment of the present invention.

FIG. 4 shows a system configuration example in a second embodiment of the present invention. The same symbols are attached to the components that are the same as those of FIG. 1, and their descriptions are omitted.

In the figure, a configuration is shown such that, for the logs that are generated in real time in the monitoring target device h, presence or absence of an advance log is identified online, while setting the present time as the specific event (the target event).

As a use situation, for example, it can be used for a case where a user reports a failure.

For each log information item that is collected by the log collecting device 2, the template generating device 3 determines which template it belongs to, and at the same time, monitoring device information is assigned to it, and it is stored in the template information DB 1. Additionally, in order to determine an amount of logs that is generated in a time zone that is the same as the present time, an amount of logs that is generated in a time width is sequentially stored in an hourly log amount DB 6.

In the monitoring device information analyzing device 20, a time interval for performing analysis is optional; however, upon reaching analysis start time that is set by the user 5 in advance, advance logs are extracted by a method that is the same as that of the first embodiment, while setting the present time as the time of occurrence of the target event, and they are sequentially reported to a user through the user interface 21.

Third Embodiment

This embodiment is a case where information other than the log information of the monitoring target device is provided as an input.

If the information is discretized so that numbers 1, 2, . . . can be assigned, such as the template ID, the previously described first and second embodiments can be applied; however, if it is numerical value information of a continuous value, such as a CPU usage rate, and a traffic volume, it can be handled the same as the template that is associated with the log information, if it is discretized offline in advance by the user 5.

Figure 5:
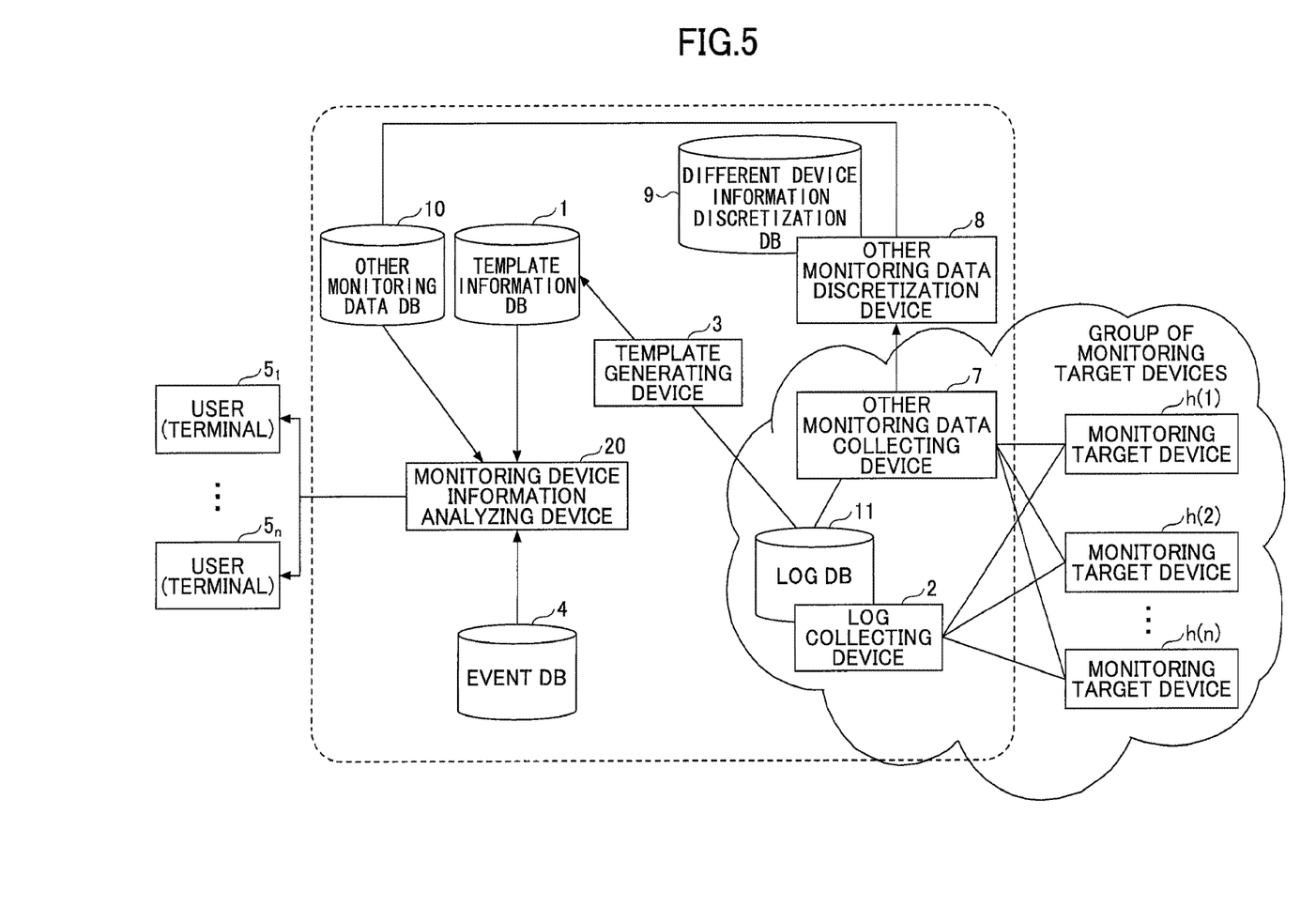
FIG. 5 is a diagram showing a system configuration example in a third embodiment of the present invention.

FIG. 5 shows a system configuration example in the third embodiment of the present invention. In the figure, the same symbols are attached to the components that are the same as those of FIG. 1, and their descriptions are omitted.

In the system that is shown in FIG. 5, another monitoring data collecting device 7 that is different from the log collecting device 2, another monitoring data discretization device 8, a different device information discretization DB 9, and another monitoring data DB 10 are added to the configuration of FIG. 1.

The other monitoring data collecting device 7 obtains discretized information, such as a CPU usage rate, and a traffic volume, that is associated with the device ID(h) from the monitoring target device h.

The other monitoring data discretization device 8 obtains the collected discretized information, and stores it in the different device information discretization DB 9; and the log collecting device 2 executes matching between log information that arrives at any time and the discretized information based on the device ID(h), and stores them in the other monitoring data DB 10, while associating them.

The monitoring device information analyzing device 20 extracts advance logs by using the template information DB 1, and at the same time, associates the advance logs with the information of the other monitoring data DB 10, and outputs them. The process of the monitoring device information analyzing device 20 is the same as that of the first embodiment during off-line, and it is the same as that of the second embodiment during on-line.

Note that, in the above-described operation, each component of the monitoring device information analyzing device 20 that is shown in FIG. 2 can be constructed as a program, and it can be installed on a computer that is used as a monitoring device information analyzing device to execute it, or it can also be distributed through a network.

The present invention is not limited to the specifically disclosed embodiments, and variations and modifications may be made without departing from the scope of the present invention.

The present application is based on and claims the benefit of priority of Provisional U.S. Patent Application No. 62/121,021 filed on Feb. 26, 2015, the entire contents of which are hereby incorporated herein by reference.

What is claimed is:

1. A monitoring device information analyzing device for extracting, from log information that is output from a plurality of monitoring target devices, an advance log such that there is a change in an amount of generation before and after a specific event, the monitoring device information analyzing device comprising:
　processing circuitry; and
　a memory that includes instructions, which when executed, cause the processing circuitry to execute the following steps:
　upon detecting that a target event, a monitoring target device h, time of occurrence of the target event, end time of the target event, and a time width ($T_{pre}$, $T_{pos}$) before and after the target event are input, calculating a variation in an amount of generation of a specific log message by the monitoring target device h before and after the time of occurrence of the target event within the time width for a date on which the target event occurs and calculating variations in the amount of generation of the specific log message by the monitoring target device h before and after the time of occurrence of the target event within the time width for a plurality of respective dates other than the date on which the target event occurs, so as to obtain a plurality of variations in the amount of generation of the specific log message as samples by referring to a template information storage unit storing time points at which respective log messages have occurred; templates respectively associated with an ID of the monitoring target device h, the templates being parts of the respective log messages; and template IDs of the respective templates,
　executing verification according to a statistical method using the samples; and
　determining the specific log message as the advance log, if a test statistic of the samples is greater than a predetermined threshold.

2. The monitoring device information analyzing device according to claim 1, wherein the steps executed by the processing circuitry further include:
　calculating an amount of generation of the templates ($p_{ih}$) of the monitoring target device h that is generated within a time interval from $T_{pre}$ hours before the time of occurrence of the target event until the time of occurrence of the target event, and an amount of generation of the templates ($q_{ih}$) of the monitoring target device h that is generated within a time interval from the end time of the target event to $T_{pos}$ hours after the end time of the target event;
　calculating an amount of generation of the templates ($p_{ih}(n)$) of the monitoring target device h that is generated within a time interval from $T_{pre}$ hours before the time of occurrence of the target event until the time of occurrence of the target event on n days before, and an amount of generation of the templates ($q_{ih}(n)$) of the monitoring target device h that is generated within a time interval from the end time of the target event to $T_{pos}$ hours after the end time of the event on the n days before; and
　calculating, as the plurality of variations in the amount of generation of the specific log message, a log difference or a log ratio between the amounts of generation of the templates ($p_{ih}$, $q_{ih}$) and the amounts of generation of the templates ($p_{ih}(n)$, $q_{ih}(n)$).

3. The monitoring device information analyzing device according to claim 1, wherein the steps executed by the processing circuitry further include:
　upon detecting that a number of the obtained samples is less than or equal to a predetermined number, calculating variations in the amount of generation of the specific log message by a monitoring target device h' that is different from the monitoring target device h; and
　correcting the calculated variations in the amount of generation of the specific log message by the monitoring target device h' using a function.

4. The monitoring device information analyzing device according to claim 1, wherein the steps executed by the processing circuitry further include:
　merging, for all given target events, advance logs that are obtained by the verification; and
　outputting the merged advance logs.

5. A monitoring device information analyzing method for extracting, from log information that is output from a plurality of monitoring target devices, an advance log such that there is a change in an amount of generation before and after a specific event, the monitoring device information analyzing method comprising:
　upon detecting that a target event, a monitoring target device h, time of occurrence of the target event, end time of the target event, and a time width ($T_{pre}$, $T_{pos}$) before and after the target event are input, calculating a variation in an amount of generation of a specific log message by the monitoring target device h before and after the time of occurrence of the target event within the time width for a date on which the target event occurs and calculating variations in the amount of generation of the specific log message by the monitoring target device h before and after the time of occurrence of the target event within the time width for a plurality of respective dates other than the date on which the target event occurs, so as to obtain a plurality of variations in the amount of generation of the specific log message as samples, by referring to a template information storage unit storing time points at which respective log messages have occurred; templates respectively associated with an ID of the monitoring target device h, the templates being parts of the respective log messages and template IDs of the respective templates, executing verification according to a statistical method using the samples; and determining the specific log message as the advance log, if a test statistic of the samples is greater than a predetermined threshold.

6. The monitoring device information analyzing method according to claim 5, further comprising:

calculating an amount of generation of the templates ($p_{ih}$) of the monitoring target device h that is generated within a time interval from $T_{pre}$ hours before the time of occurrence of the target event until the time of occurrence of the target event, and an amount of generation of the templates ($q_{ih}$) of the monitoring target device h that is generated within a time interval from the end time of the target event to $T_{pos}$ hours after the end time of the target event;

calculating an amount of generation of the templates ($p_{ih}(n)$) of the monitoring target device h that is generated within a time interval from $T_{pre}$ hours before the time of occurrence of the target event until the time of occurrence of the target event on n days before, and an amount of generation of the templates ($q_{ih}(n)$) of the monitoring target device h that is generated within a time interval from the end time of the target event to $T_{pos}$ hours after the end time of the event on the n days before; and calculating, as the plurality of variations in the amount of generation of the specific log message, a log difference or a log ratio between the amounts of generation of the templates ($p_{ih}$, $q_{ih}$) and the amounts of generation of the templates ($p_{ih}(n)$, $q_{ih}(n)$).

7. The monitoring device information analyzing method according to claim 5, further comprising:

upon determining that a number of the obtained samples is less than or equal to a predetermined number, calculating variations in the amount of generation of the specific log message by a monitoring target device h' other than the monitoring target device h; and correcting the calculated variations in the amount of generation of the specific log message by the monitoring target device using a function.

8. A non-transitory storage medium storing a monitoring device information analyzing program for causing a computer to function as a monitoring device information analyzing device for extracting, from log information that is output from a plurality of monitoring target devices, an advance log such that there is a change in an amount of generation before and after a specific event, wherein the monitoring device information analyzing device comprises:

processing circuitry, and the monitoring device information analyzing program causes the processing circuitry to execute the following steps:

upon detecting that a target event, a monitoring target device h, time of occurrence of the target event, end time of the target event, and a time width ($T_{pre}$, $T_{pos}$) before and after the target event are input, calculating a variation in an amount of generation of a specific log message by the monitoring target device h before and after the time of occurrence of the target event within the time width for a date on which the target event occurs and calculating variations in the amount of generation of the specific log message by the monitoring target device h before and after the time of occurrence of the target event within the time width for a plurality of respective dates other than the date on which the target event occurs, so as to obtain a plurality of variations in the amount of generation of the specific log message as samples, by referring to a template information storage unit storing time points at which respective log messages have occurred; templates respectively associated with an ID of the monitoring target device h, the templates being parts of the respective log messages; and template IDs of the respective templates, executing verification according to a statistical method using the samples; and determining the specific log message as the advance log, if a test statistic of the samples is greater than a predetermined threshold.

* * * * *